Feb. 21, 1967  S. POLANSKY  3,304,557
SURGICAL PROSTHESIS
Filed Sept. 28, 1965  2 Sheets-Sheet 1
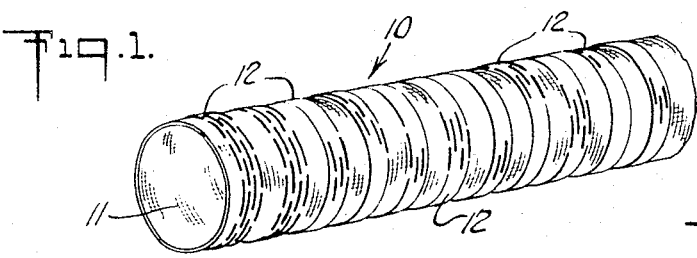
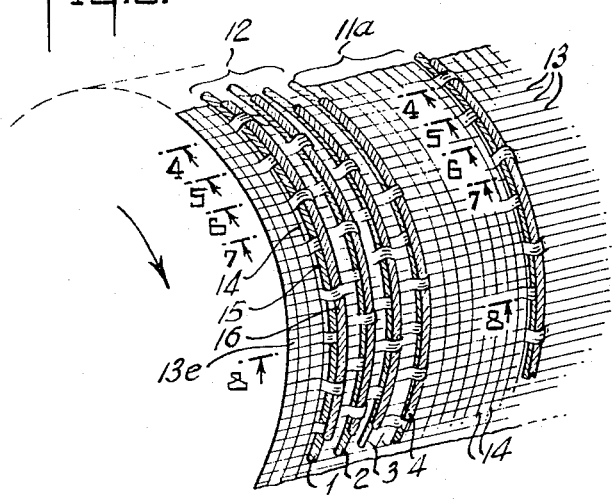
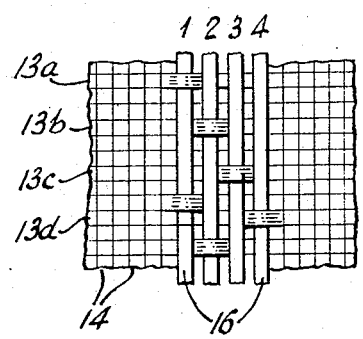
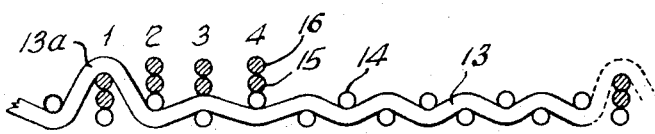
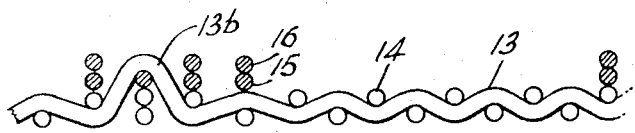
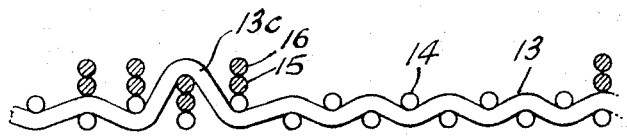
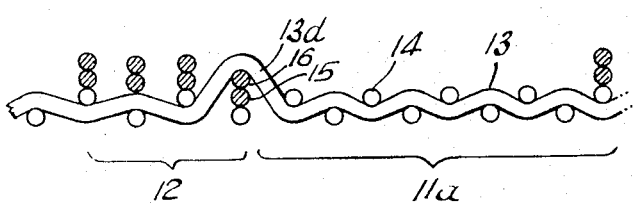
INVENTOR.
SEYMOUR POLANSKY
Flynn, Marn & Jangarathi
ATTORNEY Feb. 21, 1967 S. POLANSKY 3,304,557
SURGICAL PROSTHESIS
Filed Sept. 28, 1965 2 Sheets-Sheet 2
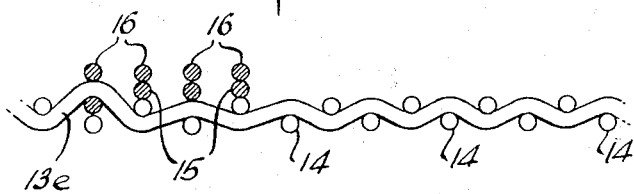
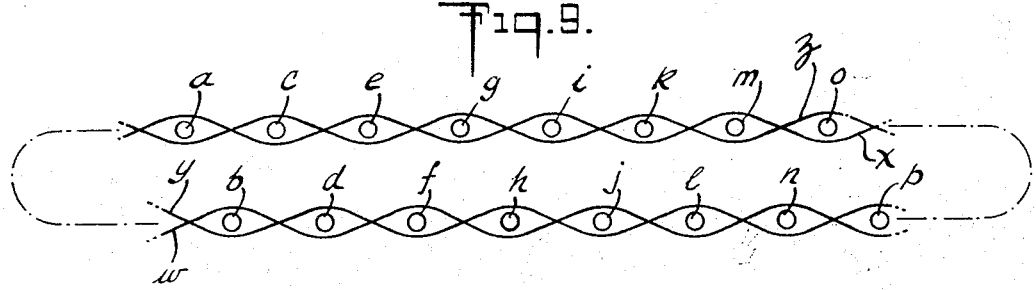
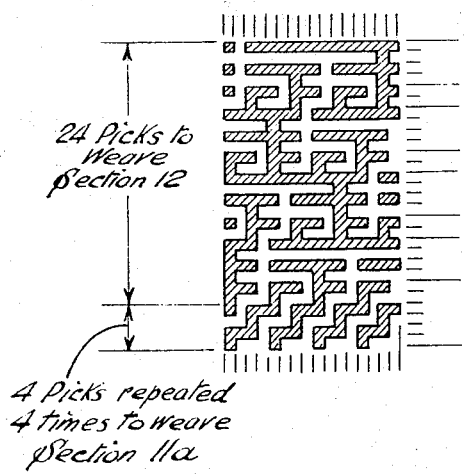
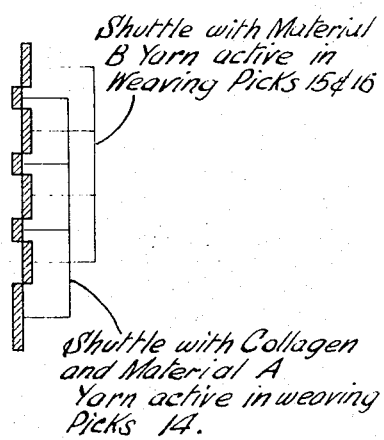
INVENTOR.
SEYMOUR POLANSKY
BY Flynn, Marr & Jangmichl
ATTORNEY

United States Patent Office 3,304,557
Patented Feb. 21, 1967

3,304,557
SURGICAL PROSTHESIS
Seymour Polansky, Riverside, Conn., assignor to Ethicon, Inc., Somerville, N.J., a corporation of New Jersey
Filed Sept. 28, 1965, Ser. No. 502,801
16 Claims. (Cl. 3—1)

The present application is a continuation-in-part of my earlier filed copending applications Serial No. 246,002 filed December 20, 1962, now abandoned, and Serial No. 267,083 filed March 22, 1963 (now abandoned).

This invention relates to prostheses requiring support to maintain an open lumen when placed in an animal body, particularly in the human body. More particularly, the invention has to do with artificial parts for an animal body.

During the past decade, considerable attention has been given to development of artificial vascular parts or grafts as implants for animal bodies. Synthetics such as Vinyon-N, nylon, Orlon, Dacron, Teflon and Ivalon have been woven and knitted into tubes and other suitable shapes, for use as arteries, veins, ducts, esophagi and the like. It has been recognized that an artificial graft must meet a number of standards in order to be of value. In particular, the graft must have certain physical properties such that it can be readily handled and manipulated during the specific surgery calling for its use. It must be flexible, for such is essential during an operation when time is critical and the graft must be accommodated to the artery, vein or the like to which it is being secured. It is sometimes necessary in surgery to bend a device or graft either around or under a body organ. An essential feature is that the graft be sufficiently rigid, though bendable, to allow for flexing without collapse and closing of the lumen thereof. If the graft does not have such strength, there is ever present the danger that when bent or flexed acutely in the body the lumen would collapse, leading to fatality.

It has also been recognized that a suitable prosthesis for the body should be non-toxic, flexible and porous. The ideal prosthesis should retain its strength permanently in intimate contact with the body fluids and should be readily accepted and incorporated into the tissues. Porosity is an important characteristic of such a prosthesis to avoid the formation of fluid pockets and to promote the growth through the fabric of repair tissue. Proper merging of the fabric with the body structure is also essential.

It is an object of this invention to provide flexible implants in the form of a tube comprising an association of collagen and a non-absorbable material wherein collagen and a non-absorbable material, in the form of a reinforcement, are integrated according to a predetermined pattern. A further object is to provide a tube in which a non-absorbable material is integrated in the form of a pattern adjacent the outer surface only of the tube to provide mechanical support therefor. Still another object is to form artificial vascular parts for an animal body suitable for use as arteries, veins, ducts, esophagi, trachea, or the like, the parts having desired porosity and being free from kinking or collapsing in any desired diameter or length. Still other objects of the invention will appear from the following description.

The foregoing objects are realized by providing an article of cylindrical tube shape comprising an association of collagen and a non-absorbable material A having integrated therewith a non-absorbable material B. Material B is integrated in a patterned arrangement with an association of collagen and material A to provide mechanical support. Particularly preferred, however, is an article wherein material B is so integrated upon the outer surface only of the tube as to provide mechanical support for said tube. As used herein, the term "integrated" means that material B is actually incorporated into the structure of the tube, as by weaving, such that material B is established as an integral and patterned portion of the tube. As pointed out hereinafter in more detail, materials A and B can be the same or different.

A better understanding of the invention may be had from the following description read in conjunction with the accompanying drawings in which:

FIGURE 1 is a perspective view of a reinforced collagen-containing tube embodying the invention;

FIG. 2 is a diagrammatic perspective view, somewhat enlarged, of a portion of the tube shown in FIG. 1;

FIG. 3 is a planar development of a portion of the surface of FIG. 2;

FIGS. 4, 5, 6, 7, and 8 are, respectively, longitudinal sectional views on lines 4—4, 5—5, 6—6, 7—7, and 8—8 of FIG. 2 looking in the direction of the arrows shown in the last-mentioned figure;

FIG. 9 is a diagrammatic view illustrating the manner in which the body portion of the collagen-containing tube can be woven, it being understood that the selvedged edges of the woven member complete the tube as indicated by dotted lines;

FIG. 10 is a weave pattern for a tube embodying the present invention; and

FIG. 11 indicates diagrammatically the shuttles which are active in weaving the various picks in accordance with the pattern of FIG. 10.

Collagen used herein can be prepared as described in United States Patent No. 2,920,000 of H. R. Hochstadt and E. R. Lieberman. The preparation of a collagen multifilament suitable for use is described in copending application Serial No. 216,247, filed August 10, 1962, and Example XII of U.S. Patent No. 3,114,372.

The artificial vascular parts or tubes contemplated herein, comprise collagen filaments associated with filaments of a non-absorbable material which has been designated as "material A." Material A is not absorbed by an animal body, such as the human body, when present therein over extended time intervals (e.g., a decade). Material A can be natural or synthetic. Examples of suitable materials from which such filaments can be made are: Vinyon-N, a resin manufactured by the Carbide & Carbon Corporation, by copolymerizing vinyl chloride and acrylonitrile; Saran, a vinyl chloride polymer manufactured by the Dow Chemical Company; nylon, a polyamide resin made by polymerization of the hexamethylene diamine salt of adipic acid; Orlon, a synthetic fiber made from polyacrylonitrile; Dacron, a synthetic fiber made from terephthalic acid and ethylene glycol; Teflon, a tetrofluoroethylene polymer; polyolefins such as polyethylene and polypropylene. Nylon, Orlon, Dacron, and Teflon are products of the E. I. du Pont de Nemours & Co. Preferred herein are Dacron, Teflon and polyolefins.

The filaments of non-absorbable material B is integrated as a reinforcing element with a collagen-nonabsorbable material A tube, can be the same as material A or can be different. In general, material B is the same as material A and is one of those given above under the designation "material A." In the event that material B differs from material A, it is also taken from the same group of materials identified by the designation "material A."

In the embodiment of the invention illustrated in the several figures, there is provided a woven tube 10 having a main or body portion 11 extending throughout its length with a series of reinforcing ring sections 12 spaced along the tube adjacent its outer surface and forming an integral part thereof. The tube comprises warp yarns 13 which are multifilaments made of mixtures of collagen filaments and filaments of any other material A heretofore suggested. Appropriate percentages of the respective filaments desirably included in each of the yarns are set forth in examples to follow.

The tube in its main or body portion has weft yarns or picks 14 which can be the same as those used in the warp or which can possess different percentages of collagen filaments and other filaments of material A depending upon the characteristics desired to be built into the implant. The tube in its reinforcing ring sections 12 comprises additional picks or weft yarns 15 and 16 of material B integrated into the weave and which serve to prevent it from kinking or collapsing even when repeatedly flexed. The picks 15 and 16 of material B can be multifilaments or monofilaments, preferably the latter and preferably heavier than the warp or the other weft threads and of a size dependent upon the strength desired to be built into the implant. These reinforcing picks (15 and 16) can be made of a non-absorbable material B which can be the same as the non-absorbable material A incorporated in those yarns which include the collagen or they can be made of a different non-absorbable material as previously pointed out.

Between the ring sections 12 of the tube there are body sections 11a in which each pick 14 weaves above alternate warp yarns and below intervening warp yarns. In the ring sections 12 per se, the picks are arranged in four groups 1, 2, 3, and 4, of three picks each of which one pick in each group, i.e., the inner pick 14 preferably is woven of the same yarn as in the body sections 11a between ring sections, and with the same type of weave, i.e., above alternate warp yarns and below intervening warp yarns (FIG. 2). The picks 14 in the ring sections lie in the same cylindrical surface as the picks 14 in the body sections 11a of the tube between ring sections. Adjacent the outer surface of the tube there is in each group of picks in the ring sections, a pick of the reinforcing material which floats over three warp yarns and passes beneath each fourth warp yarn, and a pick 16 of reinforcing material which overlies pick 15 and which floats over seven warp yarns beneath each eighth warp yarn. The underlying floater yarns 15 in each group pass under the same warp yarns as do the overlying floater yarns 16 in such group, but the underlying floaters pass beneath additional warp yarns which are located intermediate those under which the overlying floater yarns pass.

In each ring section and as between the groups 1, 2, 3, and 4, the overlying floater picks 16 of the respective groups pass beneath warp yarns spaced three away in the circumferential direction of the large arrow (FIG. 2) from the warp yarns under which pass the overlying floater of the group next to the left. Thus, in the section of FIG. 4, warp yarn 13a passes over both floaters in leftmost group 1. In the section of FIG. 5, warp yarn 13b is spaced three warp yarns away from warp yarn 13a and likewise passes over both floaters 15 and 16 in group 2. In the section of FIG. 6, warp yarn 13c is spaced three yarns away from warp yarns 13b and overlies picks 15 and 16 in group 3. And in the section of FIG. 7, warp yarn 13d is spaced three warp yarns away from warp yarn 13c and overlies picks 15 and 16 in group 4. This arrangement is repeated in the respective groups every eighth warp yarn around the tube in the direction of the arrow.

In the section shown in FIG. 8, warp yarn 13e passes over the underlying pick 15 in group 1 and under the overlying pick 16 in that group. This pattern is repeated at spaced intervals of eight warp yarns in the circumferential direction of the arrow as regards each group and at spaced intervals of three warp yarns in the direction of the arrow as between the respective groups 1, 2, 3, and 4 in each ring section.

With a weave pattern of the type just described, the inner wall of the body portion of the tube comprising warp yarns 13 and picks 14 is substantially uniform through out its length and devoid of ridges or prominent protuberances as might lessen the efficiency of flow within the tube in an animal body. The picks 15 and 16 comprising the floaters of the ring sections 12 and which supply the necessary rigidity in the tube are integrated into the weave of the ring sections but only adjacent the outer surface of the tube.

A weave pattern which results in a woven tube of the type heretofore referred to is shown in FIG. 10. This pattern from left to right covers a series of sixteen warp yarns and is repeated thoughout each adjacent group of sixteen warp yarns. The pattern also includes from top to bottom a series of twenty-four picks constituting the ring sections 12 of the tube and a series of sixteen picks constituting the body sections 11a of the tube. Insofar as the actual wall of the tube is concerned, however, as distinguished from the manner in which it is woven, this pattern reflects a series of twelve picks comprising the groups 1, 2, 3, and 4, in the ring sections 12 of the tube and a series of eight picks in the body sections 11a of the tube. The reason for this is that the tube is woven flat and the weave pattern is such that the loom shuttle, as it travels in one direction, cooperates with different groups of warp yarns from those it cooperates with on the return stroke of the shuttle. In that portion of the pattern which corresponds to the body portion 11a of the tube, four picks are laid down before the weave pattern is repeated. In the pattern, the shaded squares represent a condition where the warp overlies the pick during the shuttle travel and the unshaded squares a condition where the pick overlies the warp during shuttle travel. The type of fabric formed from this pattern in the body portion 11a of the tube is exemplified in Example I and in FIG. 9 where "over" and "under" indicates the location of the warp with respect to the pick, "$l$ to $r$" and "$r$ to $l$" (i.e., left to right and right to left, respectively) the direction of shuttle movement; and the letters $a$ to $p$ of the alphabet indicate the designation of warp yarns, which in FIG. 9 are illustrated diagrammatically with alternate warp yarns at different levels, as an aid to understanding.

*Example 1*

|  |  |  | Over |  |  |  |  |  |
|---|---|---|---|---|---|---|---|---|
|  |  |  | Under |  |  |  |  |  |
| 1 to r Pick w |  | a | b | c,d,e | f | g,h,i | j | k,l,m | n | o,p |
| r to l Pick x | a,b | c | d,e,f | g | h,i,j | k | l,m,n | o | p |
| 1 to r Pick y | a,b,c | d | e,f,g | h | i,j,k | l | m,n,o | p |
| r to l Pick z | a | b,c,d | e | f,g,h | i | j,k,l | m | n,o,p |

The shuttle in laying pick w in each repeat pattern represented by FIG. 9 travels first under warp yarn *a* located in the top level, and then over warp yarn *b*, in the lower level. Thereafter, the shuttle passes under groups of three warp yarns *c–d–e, g–h–i,* and *k–l–m,* of which two warp yarns are located in the top row and one warp yarn on the bottom row, and over other single warp yarns *f–j–n*. On the return stroke, reading from right to left, the shuttle in laying down pick *x* passes first over warp yarn *p* located on the bottom row, then under warp yarn *o* located in the top row, then over the next three warp yarns *n–m–l* located two in the bottom row and one in the top row and, continuing on the return throw, under warp yarns *k–g–c* in the top row and over groups of warp yarns *j–i–h, f–e–d* and *b,* located in accordance with the pattern, two in the bottom row and one in the top row except for *b*.

In laying down the third pick *y*, the shuttle, in accordance with the pattern, travels from left to right under the groups of warp yarns *a–b–c, e–f–g, i–j–k* and *m–n–o* located two in the top row and one in the bottom row, and over warp yarns *d–h–l–p* located in the bottom row. And again on its return stroke from right to left, in accordance with the pattern, the shuttle in laying down pick *z* passes over groups of warp yarns *p–o–n, l–k–j, h–g–f,* and *d–c–b* located two in the bottom row and one in the top row, and under warp yarns *m–i–e–a*.

In accordance with that pattern, two distinct layers of fabric are woven which are joined together at the selvedge edges with each pick in the respective layers passing over alternate warp yarns and under intervening warp yarns, and with adjacent picks in said layers passing over the intervening yarns and under the alternate yarns. Such a woven fabric can be blocked into a cylinder.

With this explanation, one skilled in the art can readily weave the pattern of reinforcing floater picks illustrated in FIGS. 1 to 3, by following the diagram illustrated in FIG. 10. In this connection it is to be noted that the yarn for picks 14, constituting the body portion of the tube, is carried by one shuttle while the yarn for the reinforcing picks 15 and 16 is carried by a different shuttle (FIG. 11), the loom being provided with a plurality of boxes at each side to receive the different shuttles and which can be selectively brought into operative position as demanded by the pattern. Again, with reference to the pattern shown in FIG. 10, in each group of picks 14, 15 and 16, that pick which has the greatest degree of float is laid down first, namely, the pick 16 corresponding to the top row in the pattern as the shuttle travels from left to right and the second row of the pattern as the shuttle returns from right to left. Thereafter, during the next four throws of the shuttle, the take-up of the loom is stopped in order to obtain the appropriate overlying and underlying relationship for the other picks 14 and 15 in the group. In other words, out of each six throws of the shuttle (four to lay down the reinforcing picks 15 and 16 and the two picks 14 in the body portion of the tube) the take-up of the loom is stopped on the third, fourth, fifth, and sixth throws of the shuttle.

It will be understood, of course, that many variations in weaving pattern can be made using the same combination of yarns and with different combinations of yarns, all in order to carry out the general scheme of the invention which contemplates the integration of a general pattern of reinforcing elements into a tube but adjacent only the outer surface thereof. For example, instead of the annular ring configuration shown in FIG. 1, the reinforcement can be in the form of a helix, alternating rings and helix, double helixes, half-loops, etc.

Material A is used in the form of multifilament yarns, and material B is used in the form of monofilament yarns. Depending upon the requirements of the implant, desired rigidity thereof can be achieved by a "heat-setting" treatment. Multifilament yarns and low gauge monofilament yarns are generally heat-set. While heavier gauge monofilaments do not generally require "heat-setting" to provide approximately the same rigidity, it is preferable to heat-set. A tube can be heat-set when it is placed on a mandrel or rod which has an external diameter slightly less than that of the tube. The tube with mandrel inserted therethrough is then heated to a temperature from about 100° C. to 170° C. for approximately 20–5 minutes, during which time the tube is heat-set; that is, it assumes a substantially rigid configuration. It is to be understood that conditions of temperature and time will vary with the character of materials A and B and the quantity of collagen present; however, the conditions selected will fall within the range given.

Approximate percentage ranges by weight of collagen and materials A and B used herein, are as follows: collagen, 10 to 90; material A, 5 to 45; and material B, 5 to 45.

It is to be understood that any tanning agent for collagen can be used herein. Chromium, formaldehyde, polyhydroxyphenols, etc. can be used alone or in combination.

The present invention is more fully described and exemplified in the following examples and related discussion. It is to be understood, however, that the invention is not to be limited to any specific form of materials or conditions set forth in the examples, but is limited solely by the description in this specification and appended claims. Throughout the specification and all examples provided herein, all quantities are expressed in parts by weight unless otherwise specified.

*Example II*

In this example, a tube is formed of collagen and of Dacron, with annular rings being formed of polypropylene. The tube is woven in accordance with the pattern of FIGS. 10 and 11. One shutter of the loom carries a mixed collagen-Dacron multifilament; the second shuttle of the loom carries a polypropylene monofilament. Specifications of the tube and annular rings thereof, are:

Weave—50 picks per inch;
Warp—440 denier collagen and 140 denier Dacron, 2 ply, 2.5 turns per inch, 291 ends;
Filling—same as warp;
Ring—14.5 mil polypropylene monofilament, spacing between rings $5/32''$, width of ring $3/16''$.

*Example III*

The same warp and background filling is used as in Example II. Monofilament Saran (14 mils) is used in the second shuttle. The spacing between rings is $3/16$ inch. After weaving, the tube is "heat-set" for 20 minutes at 160° C. on a mandrel. The tube is then removed from the mandrel. Digestion with 1% aqueous trypsin solution at 7.4 pH shows that fabric skeleton is rigid radially and exhibits some longitudinal flexibility.

*Example IV*

Again, the same warp and background filling is used as in Example II. The annular ring supporting structure is made by using 18 mil Kynar (Teflon) monofilament. By simply rolling the tube repeatedly by hand, the lumen thereof is opened after digestion with trypsin. The rigidity of the tube is at least as great as that of Example III, and also exhibits an ability to be bent without collapse of the lumen and to open and close in accordion fashion.

*Example V*

The same warp and background filling—collagen and Dacron—is used as in Example II. The annular ring reinforcing structure is made using 14 mil polypropylene monofilament (picks 15 and 16). The rings are $5/32$ inch apart and 3/16 inch wide. The device is "set" on a mandrel at 160° C. for 20 minutes. This device, and several similar devices, have been implanted in dogs. All have remained patent during 4 month periods.

*Example VI*

A tube crimped on a mandrel was held in an autoclave for 12 minutes. The pressure in the autoclave was about 12 p.s.i.

In this example, a 6 inch tube was used. The tube had a diameter of 10 mms. and the mandrel upon which it was crimped had a diameter of about 9 mms.

The tube was a plain weave (one up and one down) of Dacron and collagen yarn. Collagen multifilament yarn, 190 denier, 18 ends (7½Z) and Dacron multifilament yarn, 70 denier, 34 ends (5Z) are twisted together (1 turn S ply) and used for the warp and filling. The tube is woven using a reed 28, 5 ends per dent, with 97 warp yarns and 70 picks per inch.

The tube was used for a thoracic implant in a dog. The implant continues to function after 7 months in the animal.

*Example VII*

A tube (identical to the one in Example VI) crimped on a mandrel was immersed in a large excess of water, at a temperature of 50° C. for 5 minutes, and was then dried. The tube was removed from the mandrel. When rewet with water, the tube lost very little elasticity and, when bent acutely, an open lumen was maintained. These characteristics were exhibited satisfactorily after several wetting and drying cycles.

*Example VIII*

A tube (identical to the one in Example VI) crimped on a mandrel was treated with a large excess of an aqueous tanning solution comprising 1 part of formaldehyde, chromium sulfate equivalent to 0.4 part of chromic oxide, followed by a solution of 0.5 part of pyrogallol and 0.6 part of $Na_2S_2O_4$. The tube was then dried and the mandrel removed therefrom. The characteristics of the tube were similar to those of the crimped tube obtained in Example VII.

An advantageous feature of setting the tube in crimped configuration by this tanning technique is avoidance of any collagen degradation. There is no need to heat the tube during the tanning procedure.

A 2 inch sample of this tube was stretched to 2½ inches and was implanted as an abdominal graft in a dog. The surgical procedure was without incident. The graft remains patent after three months.

It is to be understood that any of the known tanning agents for use with collagen can be used herein. Chromium, formaldehyde, polyhydroxphenols, etc. can be used alone or in combination. Particularly preferred herein, however, are the tanning procedures described in United States Patents Nos. 3,166,073 and 3,1660,074.

As indicated above the articles formed as described herein are useful as tubular grafts. They have desired characteristics as revealed by their maneuverability, flexing quality and capability of maintaining an open lumen when flexed. In addition, they have the desired feature of porosity, as well as integrating well with body tissue.

While the invention has been described in detail according to the preferred method of carrying out the process and yielding the products, it will be obvious to those skilled in the art, that changes and modifications can be made (without departing from the spirit or scope of the invention) and it is intended in the appended claims to cover such changes and modifications.

What is claimed is:

1. As a surgical prosthesis comprising, a tube having a wall fabricated of threads of collagen absorbable in live animal tissue and threads of other material non-absorbable in live animal tissue, and reinforcing means located essentially on the outer surface of said tube and spaced intermittently along the longitudinal axis thereof, said reinforcing means comprising non-absorbable threads circumferentially positioned around said tube perpendicular to said longitudinal axis.

2. A surgical prosthesis, comprising:
   a woven tube of multifilament yarn, said yarn containing collagen filaments and non-absorbable filaments; and,
   a non-absorbable monofilament located essentially on the outer surface of said tube and spaced intermittently along the longitudinal axis thereof, said monofilament being circumferentially positioned around said tube perpendicular to said longitudinal axis.

3. A surgical prosthesis, comprising:
   a woven tube of multifilament yarn, said yarn containing collagen filaments and non-absorbable filaments; and,
   a non-absorbable multifilament yarn located essentially on the outer surface of said tube and spaced intermittently along the longitudinal axis thereof, said multifilament yarn being circumferentially positioned around said tube perpendicular to said longitudinal axis.

4. The surgical prosthesis of claim 2 wherein the monofilament is patternly woven into the outer surface only of said tube to provide mechanical support therefor.

5. The surgical prosthesis of claim 2 wherein the monofilament is a terephthalic acid ethylene glycol ester fiber.

6. The surgical prosthesis of claim 2 wherein the monofilament is a tetrafluoroethylene polymer.

7. The surgical prosthesis of claim 2 wherein the monofilament is a polyethylene polymer.

8. The surgical prosthesis of claim 2 wherein the monofilament is a polypropylene polymer.

9. A surgical prosthesis, comprising:
   a tube woven of warp yarns containing collagen filaments and non-absorbable filaments and weft yarns of collagen filaments and non-absorbable filaments; and,
   non-absorbable monofilaments being integrated in a series of annular rings spaced intermittently on the outer surface only of said tube perpendicular to the longitudinal axis thereof thereby providing mechanical support for said tube.

10. The surgical prosthesis of claim 9 wherein the monofilament that forms said annular rings has the same composition as the non-absorbable filaments that are present in the warp yarns of the tube.

11. The surgical prosthesis of claim 9 wherein the monofilament that forms said annular rings has a different composition than the non-absorbable filaments that are present in the warp yarns of the tube.

12. The surgical prosthesis of claim 9 wherein the non-absorbable filaments in the warp yarns and the non-absorbable filaments integrated in a series of annular rings on the outer surface of said tube are terephthalic ethylene glycol ester filaments.

13. The surgical prosthesis of claim 9 wherein the non-absorbable filaments in the warp yarns and the non-absorbable filaments integrated in a series of annular rings on the outer surface of said tube are tetrafluoroethylene filaments.

14. The surgical prosthesis of claim 9 wherein the warp and weft yarns contain from 10% to 90% collagen filaments and from 10% to 90% non-absorbable filaments.

15. The surgical prosthesis of claim 9 wherein said tube is wholly constructed of a single multifilament yarn, said yarn being characterized by the presence therein of about 2.5 parts by weight collagen monofilaments and about 1 part by weight of non-absorbable monofilaments.

16. The prosthesis of claim 15 in a permanently crimped condition.

References Cited by the Examiner

UNITED STATES PATENTS

| | | | |
|---|---|---|---|
| 2,127,903 | 8/1938 | Bowen | 128—334 |
| 2,352,391 | 6/1944 | Kitselman | 139—388 X |
| 2,827,359 | 3/1958 | Kine et al. | |
| 3,096,560 | 7/1963 | Liebig | 139—387 |
| 3,108,357 | 10/1963 | Liebig | 128—334 X |

OTHER REFERENCES

Allansmith: "Surgical Treatment of Superior Vena Cave Obstruction Due to Malignant Tumor," from Journal of Thoracic and Cardivas Surg., volume 44, #2, August 1962 (pp. 258–63), 128–334 Lit.

Wesolowski et al.: "Porosity: Primary Determinant of Ultimate Fate of Synthetic Vascular Grafts," Surgery, volume 50, 1961, pp. 91–6.

RICHARD A. GAUDET, *Primary Examiner.*

DALTON L. TRULUCK, *Examiner.*